(12) United States Patent
Ishi

(10) Patent No.: US 8,840,346 B2
(45) Date of Patent: Sep. 23, 2014

(54) DRILL, CUTTING INSERT, AND METHOD OF MANUFACTURING CUT PRODUCT

(75) Inventor: Hirohisa Ishi, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 857 days.

(21) Appl. No.: 12/990,776

(22) PCT Filed: May 15, 2009

(86) PCT No.: PCT/JP2009/059544
§ 371 (c)(1),
(2), (4) Date: Nov. 2, 2010

(87) PCT Pub. No.: WO2009/142323
PCT Pub. Date: Nov. 26, 2009

(65) Prior Publication Data
US 2011/0044776 A1    Feb. 24, 2011

(30) Foreign Application Priority Data

May 23, 2008  (JP) ................................ 2008-135667
Jul. 29, 2008  (JP) ................................ 2008-194981

(51) Int. Cl.
*B23B 51/02*  (2006.01)
*B23B 27/16*  (2006.01)
*B23B 35/00*  (2006.01)

(52) U.S. Cl.
CPC .............. *B23B 51/02* (2013.01); *Y10S 408/713* (2013.01)
USPC ............................ 408/224; 408/231; 408/713

(58) Field of Classification Search
CPC ...................................................... B23B 51/02
USPC .......... 408/223, 224, 231, 713, 187, 188, 1 R
See application file for complete search history.

(56) References Cited

U.S. PATENT DOCUMENTS

| 3,786,541 A | 1/1974 | Lundgren |
| 5,890,853 A | 4/1999 | Hiranaka |

(Continued)

FOREIGN PATENT DOCUMENTS

| CA | 1233630 A1 | 8/1988 |
| DE | 102006023740 A1 | 11/2007 |

(Continued)

OTHER PUBLICATIONS

Extended European search report dated Oct. 7, 2011 issued in corresponding European application 09750685.1.

(Continued)

*Primary Examiner* — Andrea Wellington
*Assistant Examiner* — Mohammad Nourbakhsh
(74) *Attorney, Agent, or Firm* — DLA Piper LLP (US)

(57) ABSTRACT

A drill, including: a substantially columnar drill holder including, at a front end portion thereof, a first insert pocket and a second insert pocket formed closer to the outer periphery of the drill holder than the first insert pocket; a first insert which is attached to the first insert pocket and includes a first cutting edge at an intersection of an upper face and a side face; and a second insert which is attached to the second insert pocket and includes a second cutting edge at an intersection of a upper face and a side face. The first insert pocket is located passing through a central axis of rotation of the drill holder. The second cutting edge has a concave shape when viewed from the front end side of the drill holder, and has a curved line at least a part thereof.

13 Claims, 12 Drawing Sheets

(56) References Cited

U.S. PATENT DOCUMENTS

| | | | |
|---|---|---|---|
| 5,967,710 A * | 10/1999 | Krenzer | 408/224 |
| 6,213,231 B1 * | 4/2001 | von Haas | 175/394 |
| 6,257,807 B1 * | 7/2001 | Heinloth | 407/113 |
| 7,677,845 B2 * | 3/2010 | Limell et al. | 408/223 |
| 2008/0075547 A1 | 3/2008 | Wolf et al. | |
| 2008/0181737 A1 * | 7/2008 | Limell et al. | 408/188 |
| 2009/0290946 A1 | 11/2009 | Zastrozynski | |
| 2010/0178122 A1 * | 7/2010 | Bae | 408/223 |

FOREIGN PATENT DOCUMENTS

| | | |
|---|---|---|
| EP | 1902799 A2 | 3/2008 |
| FR | 2158983 A5 | 6/1973 |
| FR | 2550977 A1 | 3/1985 |
| JP | 53067186 U | 6/1978 |
| JP | 58-059513 | 4/1983 |
| JP | 60114407 A | 6/1985 |
| JP | 10029108 A | 2/1998 |
| JP | 2000-202703 | 7/2000 |
| JP | 2003-062712 | 3/2003 |
| JP | 2004114269 A | 4/2004 |

OTHER PUBLICATIONS

European office action dated Feb. 22, 2013 issued in corresponding European application 09750685.1.

* cited by examiner (a) Cross section A—A (b) Cross section B—B (c) Cross section C—C (d) Cross section D—D Cross section A—A
Cross section B—B
Cross section C—C

DRILL, CUTTING INSERT, AND METHOD OF MANUFACTURING CUT PRODUCT

CROSS-REFERENCE TO THE RELATED APPLICATION

This application is a nation stage of international application No. PCT/JP2009/059544, filed on May 25, 2009, and claims the benefit of priority under 35 USC 119 to Japanese patent application No. 2008-135667, filed on May 23, 2008 and Japanese patent application No. 2008-194981, filed on Jul. 29, 2008, the entire contents all of which are incorporated herein by reference.

TECHNICAL FIELD

The present invention relates to a drill and a cutting insert used for the drill.

BACKGROUND ART

A throwaway drill has heretofore been used as a tool for drilling a workpiece such as metals or the like. In this drill, an inner edge insert with a cutting edge (inner edge) for cutting an inner peripheral portion of a lower face of a hole, and an outer edge insert with a cutting edge (outer edge) for cutting an outer peripheral portion of the lower face of the hole are detachably attached to a front end portion of a substantially cylindrical drill holder. The inner edge insert is placed on the central axis of rotation side, and the outer edge insert is placed on the outer peripheral side of the drill holder. For example, patent document 1 discloses a drill insert whose inner edge and outer edge are linear.

However, this drill insert has the problem that during cutting process of a very ductile workpiece or the like, a generated chip tends to climb over a breaker groove without being curled, and cling to the drill holder.

PRIOR ART DOCUMENTS

Patent Documents

Patent Document 1: Japanese Unexamined Patent Publication No. 2003-62712

SUMMARY OF THE INVENTION

An aspect of the present invention is to provide a drill having excellent chip discharge performance and a cutting insert used for the drill.

A drill according to an embodiment of the present invention including: a substantially columnar drill holder including, at a front end portion thereof, a first insert pocket and a second insert pocket formed closer to the outer periphery of the drill holder than the first insert pocket; a first insert which is attached to the first insert pocket and includes a first cutting edge at an intersection of an upper face and a side face; and a second insert which is attached to the second insert pocket and includes a second cutting edge at an intersection of a upper face and a side face. The first insert pocket is located passing through a central axis of rotation of the drill holder. The second cutting edge has a concave shape when viewed from the front end side of the drill holder, and has a curved line at least a part thereof.

A cutting insert according to an embodiment of the present invention is configured to be used with attached to a drill holder, and includes a cutting edge at an intersection of an upper face and a side face. The cutting edge includes a second cutting edge which is located closer to the outer periphery of the drill holder during attachment to the drill holder, and has a concave shape when viewed from side, has a curved line at least a part of the second cutting edge.

A method of manufacturing a cut product according to an embodiment of the present invention includes bringing each of the cutting edges of the inserts closer to a workpiece and rotating at least one of the workpiece and the drill; cutting the workpiece by bringing the cutting edges into contact with the surface of the workpiece; and separating the cutting edges from the workpiece.

According to the drill and the cutting insert, a chip generated by the second cutting edge is curled in a generation direction (a length direction) while making it easy for the cross-sectional shape of the chips to be in a concave shape. This facilitates stable bending of the chip when the chip contacts a machined wall surface of the workpiece. Consequently, the chip is easily divided in the length direction of the chip, and chip discharge performance can be improved by reducing the chip clinging to the holder.

According to the manufacturing method, the cut product having high finished surface accuracy can be obtained because of using the drill exhibiting excellent chip discharge performance by reducing the chip clinging to the holder.

PREFERRED EMBODIMENTS FOR CARRYING OUT THE INVENTION (First Preferred Embodiment)

Figure 1:
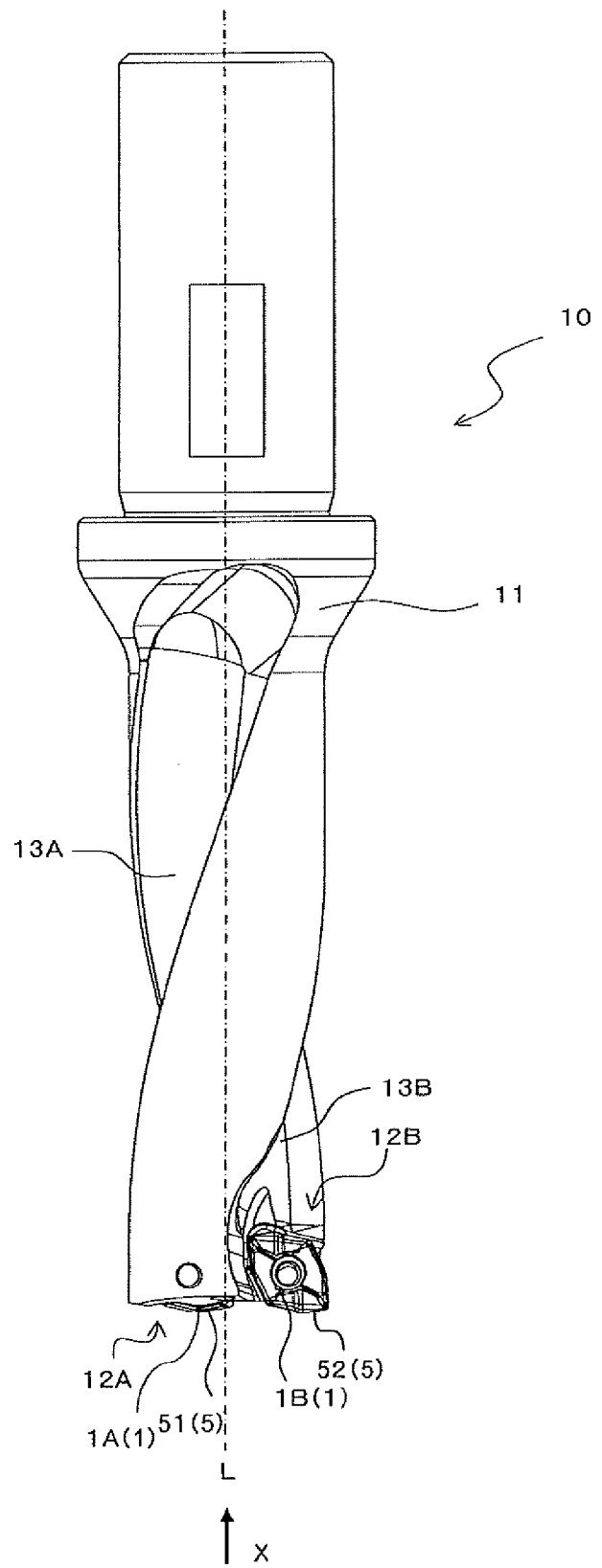
FIG. 1 is a side view of a drill according to a first embodiment of the present invention.

A drill 10 according to the first embodiment of the present invention is described in detail with reference to FIGS. 1 to 3.

The drill 10 includes a drill holder 11, and two cutting inserts 1 attached to the front end portion of the drill holder 11.

<Drill Holder>

The drill holder 11 has a substantially columnar shape, for example, a substantially cylindrical shape. The rear end of the drill holder 11 is fixed to a machine tool or a connection member. On the other hand, the drill holder 11 includes, at the front end portion thereof, a first insert pocket 12A placed to pass through the central axis of rotation when viewed from the front end side, and a second insert pocket 12B placed closer to the outer periphery of the drill holder than the first insert pocket 12A. The first insert pocket 12A corresponds to the inner edge insert pocket, and the second insert pocket 12B corresponds to the outer edge insert pocket. The number of the insert pockets may be two or more, and no particular limitation is imposed thereon. For example, a plurality of insert pockets may be further placed on the peripheral side of the second insert pocket 12B. These insert pockets are formed so that when the drill is rotated, any one of cutting edges of the inserts attached to the individual pockets passes through a line segment extending from the central axis of the front end face of the drill to the peripheral surface. In the present embodiment, as shown in FIGS. 1 to 3, the two insert pockets are formed when viewed from the front end side, and are formed so that the rotation loci of the cutting edges of the cutting inserts attached to the respective insert pockets intersect each other.

The first insert pocket 12A is opened toward the front end of the drill holder 11. The second insert pocket 12B is opened toward the front end of the drill holder 11 and toward the outer periphery thereof. As shown in FIG. 3, in the first insert pocket 12A and the second insert pocket 12B, the cutting edges of the respective cutting inserts attached thereto are placed at positions corresponding to a rotation of approximately 180° with respect to an axis L, when viewed from the front end side of the drill holder 11.

In the drill holder 11, flutes 13 (13A and 13B) are placed in communication with the first insert pocket 12A and the second insert pocket 12B, respectively. These flutes 13 serve as passages for discharging chips generated from the individual cutting edges to the outside of the drill 10. In the present embodiment, these flutes 13A and 13B are spirally formed in the outer peripheral surface of the drill holder 11 as concave-shaped grooves.

<Cutting Inserts>

Cutting inserts 1A and 1B are attached to their corresponding insert pockets 12A and 12B by screw members, respectively.

The first insert 1A has a first cutting edge (inner edge) for cutting an inner peripheral portion of a lower face of a hole during drilling of a workpiece. The second insert 1B has a second cutting edge (outer edge) for cutting an outer peripheral portion of the lower face of the hole.

The first insert 1A is attached to the first insert pocket 12A so that at least a part of the first cutting edge protrudes from the front end of the drill holder 11. The second insert 1B is attached to the second insert pocket 12B so that at least a part of the second cutting edge protrudes from the front end of the drill holder 11. In the present embodiment, the rotation locus of the first cutting edge and the rotation locus of the second cutting edge in the front end portion intersect each other. The first insert 1A and the second insert 1B are placed so that the rotation locus of the first cutting edge and the rotation locus of the second cutting edge cover from the central axis to the outer peripheral surface of the drill holder 11. When the rotation locus of the first cutting edge and the rotation locus of the second cutting edge do not intersect each other, a cutting insert with a cutting edge having a rotation locus intersecting their respective rotation loci may be placed.

The first insert 1A and the second insert 1B are attached with their respective upper faces facing the same rotating direction. In FIG. 3, the upper face of the first insert 1A and the upper face of the second insert 1B are facing the opposite directions of 180 degrees with respect to the axis L. By rotating the drill holder 11 around the axis L of the drill holder 11, the drilling of the workpiece is carried out using the first insert 1A and the second insert 1B.

Although in the present embodiment, the first insert 1A and the second insert 1B are attached to the drill holder 11 so as to have, for example, a positive axial rake, no particular limitation is imposed on the placement angle of the inserts.

In the present embodiment, the inserts having the same shape are attached in different placement manners (in different placement directions) to the first insert pocket 12A and the second insert pocket 12B, respectively. That is, the inserts of the same shape having a first cutting edge and a second cutting edge are used as the first insert 1A and the second insert 1B, respectively. When used as the first insert 1A, as shown in FIGS. 1 and 2, the insert is placed so that the first cutting edge (inner edge) protrudes from the front end of the drill holder 11 when viewed from side. On the other hand, when used as the second insert 1B, the insert is placed so that the second cutting edge (outer edge) protrudes from the front end of the drill holder 11 when viewed from side. Thus, the inserts of the present embodiment are excellent in terms of storage and management of the inserts or the costs thereof, because the identical inserts can be used as the first insert 1A and the second insert 1B.

An embodiment of the inserts 1 according to the present invention attached to the drill of the foregoing embodiment is described below in more detail with reference to FIGS. 4(a) to 7(b).

These inserts 1 according to the present embodiment have a plate shape, specifically a polygonal plate shape. These inserts 1 are formed of a sintered body, such as cemented carbide, cermet, ceramics, or the like, or the sintered body coated with a film.

Each of these inserts 1 includes an upper face 2, a lower face 3, a side face 4, and a cutting edge 5 formed on at least a part of an intersection of the upper face 2 and the side face 4.

At least a part of the upper face 2 functions as a rake face, and at least a part of the side face 4 functions as a flank face. The lower face 3 functions as a seating surface configured to contact with the insert pocket 12 formed in the drill holder 11.

The cutting edge 5 includes a first cutting edge 51 and a second cutting edge 52. The first cutting edge 51 is the cutting edge placed so that when the insert 1 is used as the inner edge insert 1A, the insert 1 passes through the central axis of rotation of the drill holder 11. The second cutting edge 52 is the cutting edge located close to the outer periphery of the drill holder 11 when the insert 1 is used as the outer edge insert 1B.

In the present embodiment, a through hole 6 for inserting the screw member during the attachment to the drill holder 11 penetrates from the upper face 2 to the lower face 3. The insert 1 has a 180-degree rotationally symmetrical shape with respect to the central axis of the through hole 6. Therefore, each insert 1 of the present embodiment includes a couple of the first cutting edges 51 and a couple of the second cutting edges 52.

These first cutting edges 51 of the present embodiment have a substantially straight-line shape, and are placed substantially parallel to the lower face 2. That is, these first cutting edges 51 are linear cutting edges whose distance from the lower face 3 is constant over the entire length thereof. This construction improves cutting edge strength.

As shown in FIG. 4(b), each of the second cutting edges 52 of the present embodiment is formed in a concave shape when viewed from side, and is formed so that at least a part thereof is in the shape of a curved line. Thereby, the cross-sectional shape of chips generated by the second cutting edge 52 can stably be formed into a substantially concave shape.

Here, the cross-sectional shape of the chips corresponds to the shape of the chips in a cross section vertical to the longitudinal direction of the generated chips.

The chips whose cross-sectional shape is the substantially concave shape are reversed while being curled by the upper face 2 (rake face), and then the chips whose cross-sectional shape is changed into a substantially convex shape contact the machined wall surface of the workpiece. On that occasion, these chips are stably bent. The bending of the chips is described later.

As described above, the first cutting edge 51 of the first insert 1A has the intersection where the rotation locus thereof and the rotation locus of the second cutting edge 52 of the second insert 1B intersect each other.

Figure 2:
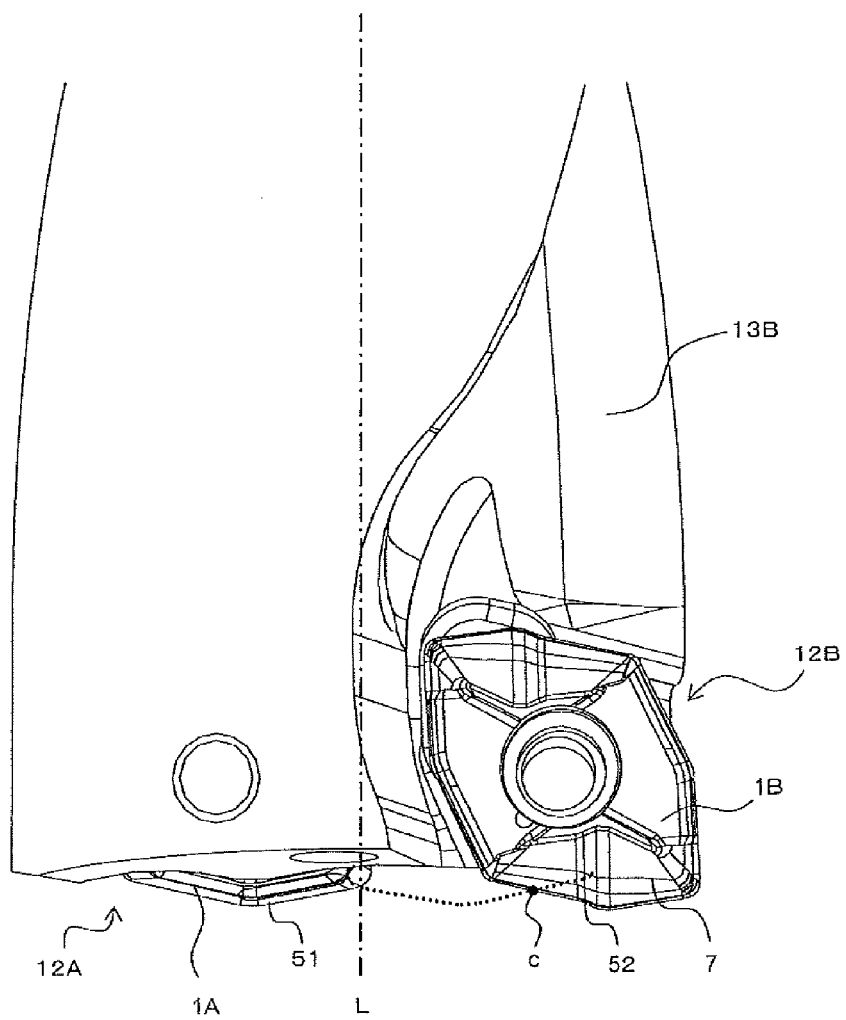
FIG. 2 is an enlarged view of an important part of FIG. 1.
Figure 3:
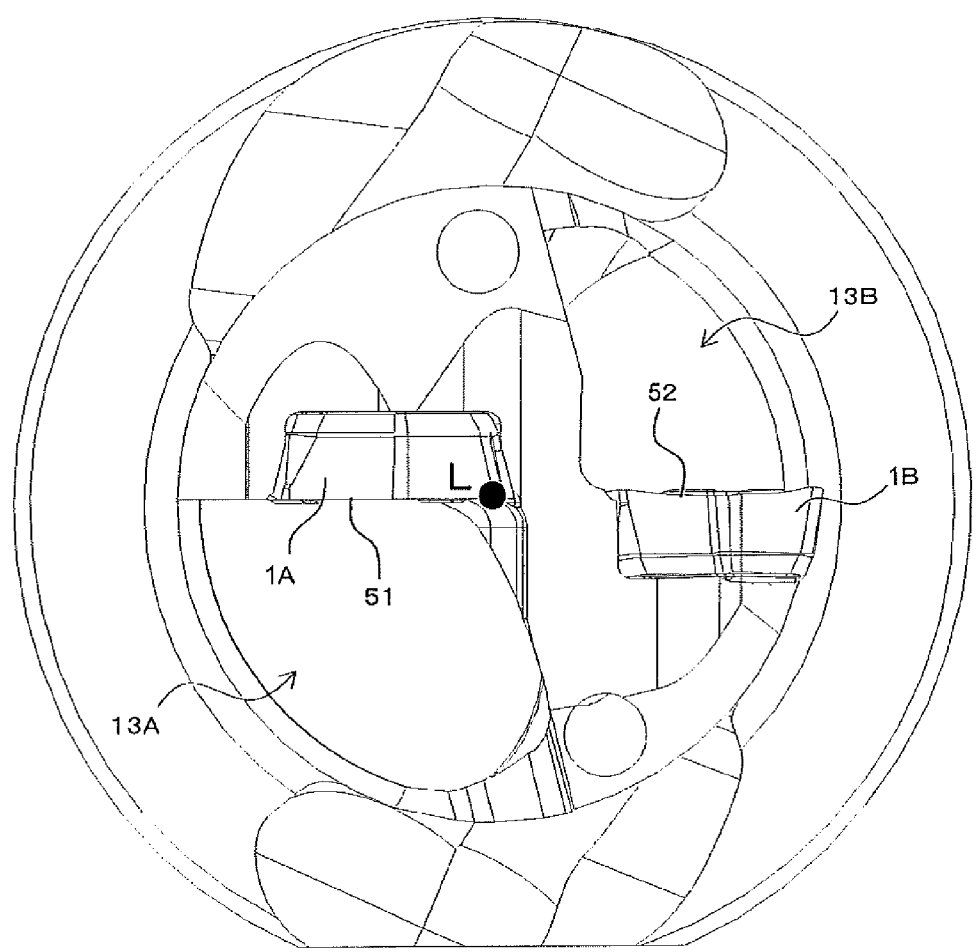
FIG. 3 is a diagram when the drill of FIG. 1 is viewed from a direction X.

The position of the first insert 1A after the first insert 1A is rotated 180 degrees with respect to the axis L of the drill holder 11 is indicated by the dotted line in FIG. 2. This dotted line is a part of the rotation locus of the cutting edge of the first insert 1A. The portion where this dotted line and the second cutting edge 52 of the second insert 1B intersect each other becomes an intersection 52c of the second cutting edge 52.

The intersection 52c is also shown in FIG. 4(b). In the present embodiment, the intersection 52c is located closer to the outer periphery of the drill holder than an end portion 52b of the second cutting edge 52 which is close to the axis of the drill holder.

The intersection 52c is located closer to the lower face 3 than an outer peripheral end portion 52a located close to the outer periphery of the drill holder 11 in the second cutting edge. Specifically, as shown in FIG. 4(b), the intersection 52 satisfies Ha>Hc where Ha is a length from the lower face 3 to the outer peripheral end portion 52a in a direction substantially vertical to the lower face 3, and Hc is a length from the lower face 3 to the intersection 52c in a direction substantially vertical to the lower face 3.

Owing to this construction, in both end portions of chips in the width direction thereof which are generated by the second cutting edge 52, their end portions close to the outer periphery firstly and stably contact the machined wall surface, so that a tensile stress can be stably generated at inner peripheral end portions of the chips. Thereby, as shown in FIGS. 7(a) and 7(b), the inner peripheral end portions of the chips are liable to be ripped at a bent portion T. Consequently, the chip discharge performance is further improved.

Further, the second cutting edge 52 satisfying Ha>Hc contacts the workpiece from the outer peripheral side, and therefore the lead at the beginning of cutting process is enhanced, and the machined surface accuracy is also improved.

Figure 4:
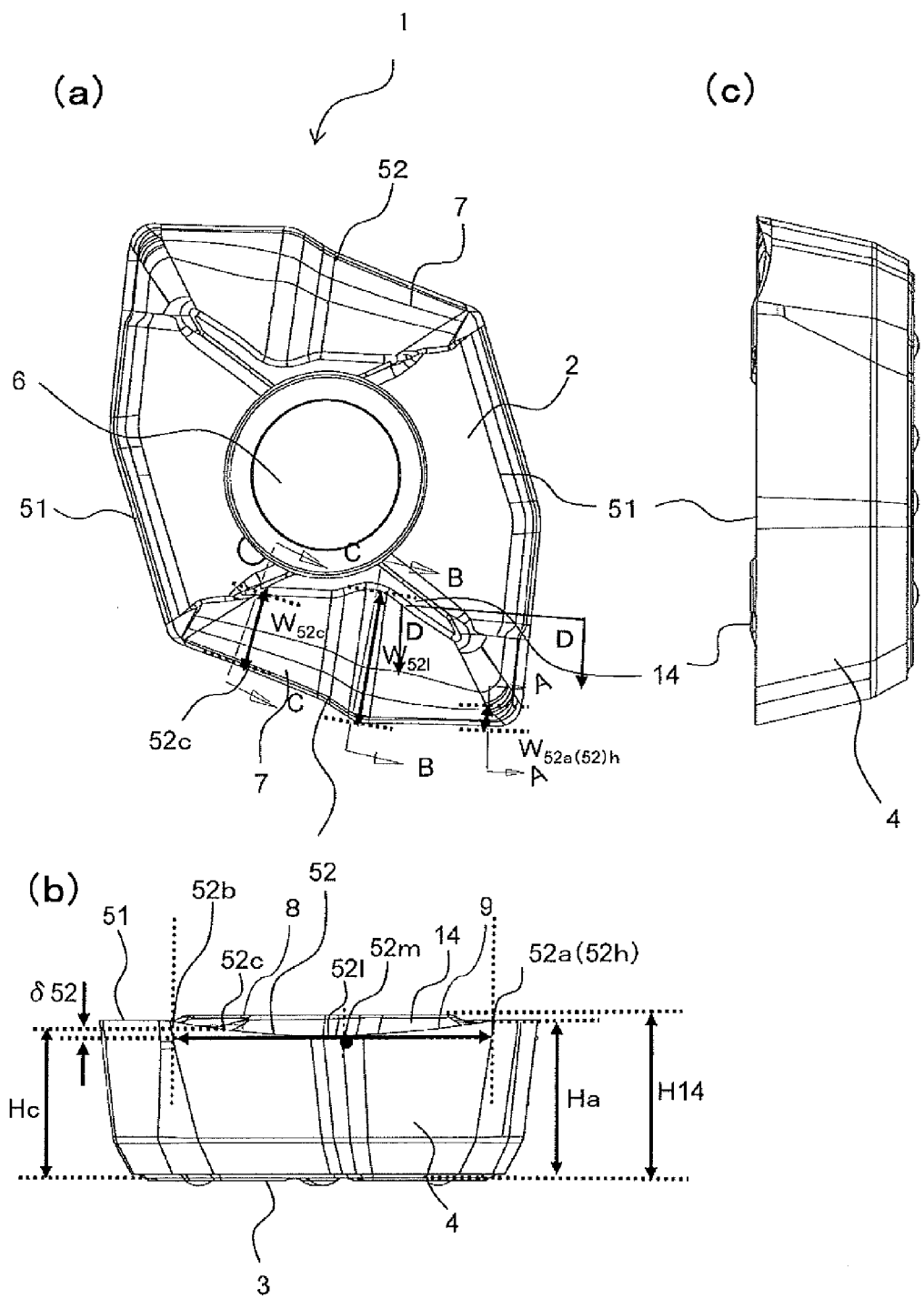
FIG. 4(a) is a top view of a cutting insert 1 according to the first embodiment of the present invention.
FIG. 4(b) is one side view thereof (a side view taken from a short side)
FIG. 4(c) is the other side view thereof (a side view taken from a long side)
FIG. 4(d) discloses two circular arc portion when viewed from side.
Figure 4D:
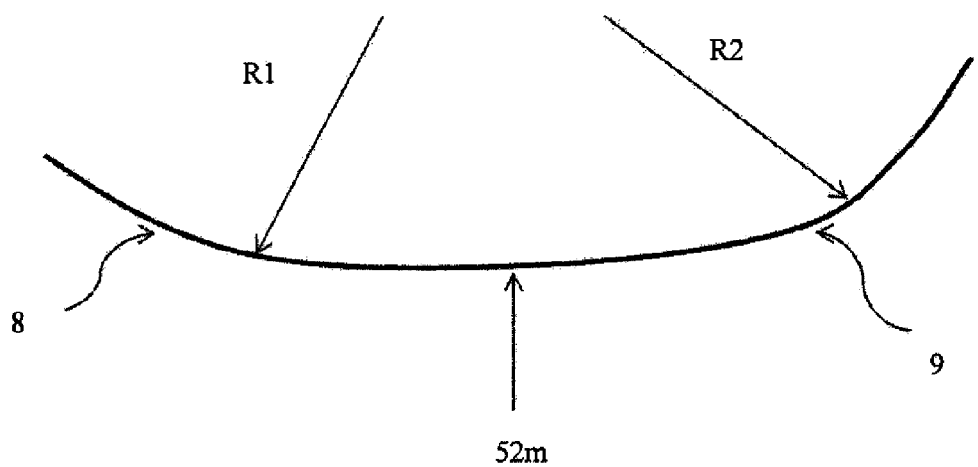

Furthermore, as shown in FIG. 4(d) the second cutting edge 52 is configured to have at least two circular arc portions when viewed from side. The second cutting edge 52 includes a circular arc portion 8 located close to the axis of the drill holder 11, and a circular arc portion 9 located close to the outer periphery of the drill holder 11. The circular arc portion 8 located close to the drill holder 11 has a radius of curvature R1, and the circular arc portion 9 located close to the outer periphery has a radius of curvature R2. That is, the second cutting edge 52 has the two circular arc portions 8 and 9 having different radii of curvature (R1≠R2). These R1 and R2 satisfy R1<R2.

With this construction, in the cross-sectional shape of the chips generated by the second cutting edge 52, the inner peripheral side of the concave-shaped portion corresponding to the portion close to the axis of the drill holder 11 is configured to have a larger inclination. Hence, at the bent portion T of the chips, a still larger tensile stress occurs in the inner peripheral end portions thereof, and a slit is liable to occur. This enhances the effect of reducing the chips clinging to the drill holder 11.

The radii of curvature of these circular arc portions 8 and 9 can be measured in a side view as shown in FIG. 4(b) by using a CCD camera and an image measuring device.

The second cutting edge 52 includes a valley portion 52l having the lowest height with respect to the lower face 3, and a top portion 52h having the highest height with respect to the lower face 3. In the present embodiment, the valley portion 52l is located closer to the axis of the drill holder 11 than a middle portion of the second cutting edge 52.

The valley portion 52l is a cutting edge portion having the minimum distance between the lower face 3 and the second cutting edge 52 in a direction substantially vertical to the lower face 3. The top portion 52h is a cutting edge portion having the maximum distance between the lower face 3 and the second cutting edge 52 in the direction substantially vertical to the lower face. Both of the valley portion 52l and the top portion 52h may be a point or a linear portion having a width.

The middle portion of the second cutting edge 52 corresponds to a middle point of the distance between both end portions 52a and 52b of the second cutting edge when viewed from the front end with the insert attached thereto. In FIG. 4(b), "52m" indicates the middle portion of the second cutting edge 52.

By allowing the valley portion 52l to be located closer to the axis of the drill holder 11 than the middle portion 52m of the second cutting edge 52, the R1 can become smaller when δ52 that is a difference between the top portion 52h and the valley portion 52l is kept constant. Thereby, the inner peripheral end portions of the chips are easily ripped, so that division of the chips in the longitudinal direction thereof is liable to occur, thereby further improving the chip discharge performance. For example, the valley portion 52l is preferably placed at a position to divide the width of the second cutting edge 52 at a ratio of 30:70 to 45:55.

Figure 5:
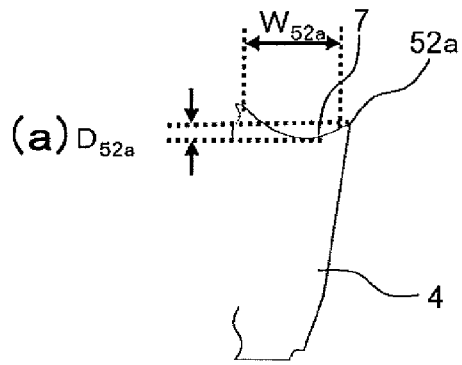
FIG. 5(a) is a sectional view taken along the line A-A in FIG. 4(a)
FIG. 5(b) is a sectional view taken along the line B-B in FIG. 4(a)
FIG. 5(c) is a sectional view taken along the line C-C in FIG. 4(a)
FIG. 5(d) is a sectional view taken along the line D-D in FIG. 4(a)
Figure 5:
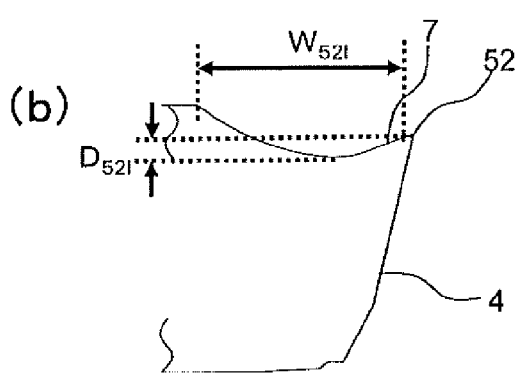
Figure 5:
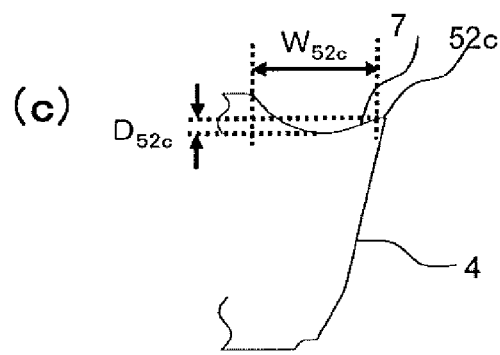
Figure 5:
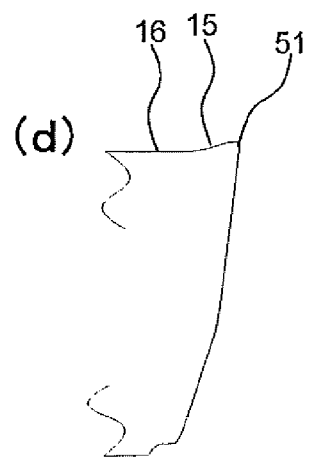
Figure 6:
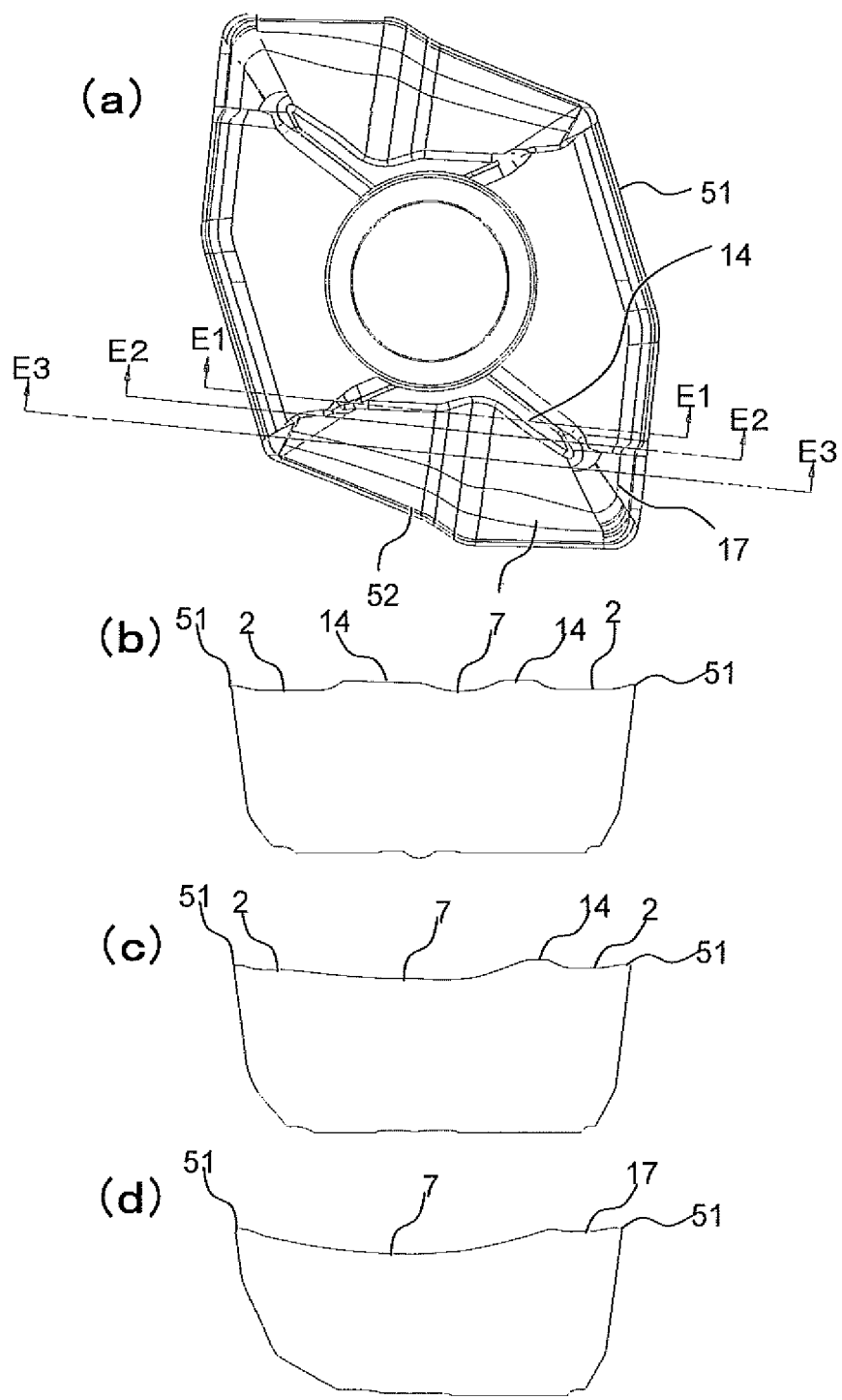
FIG. 6(a) is a top view of the insert 1.
FIG. 6(b) is a sectional view taken along the line E1-E1 in FIG. 6(a)
FIG. 6(c) is a sectional view taken along the line E2-E2 in FIG. 6(a)
FIG. 6(d) is a sectional view taken along the line E3-E3 in FIG. 6(a)
Figure 7:
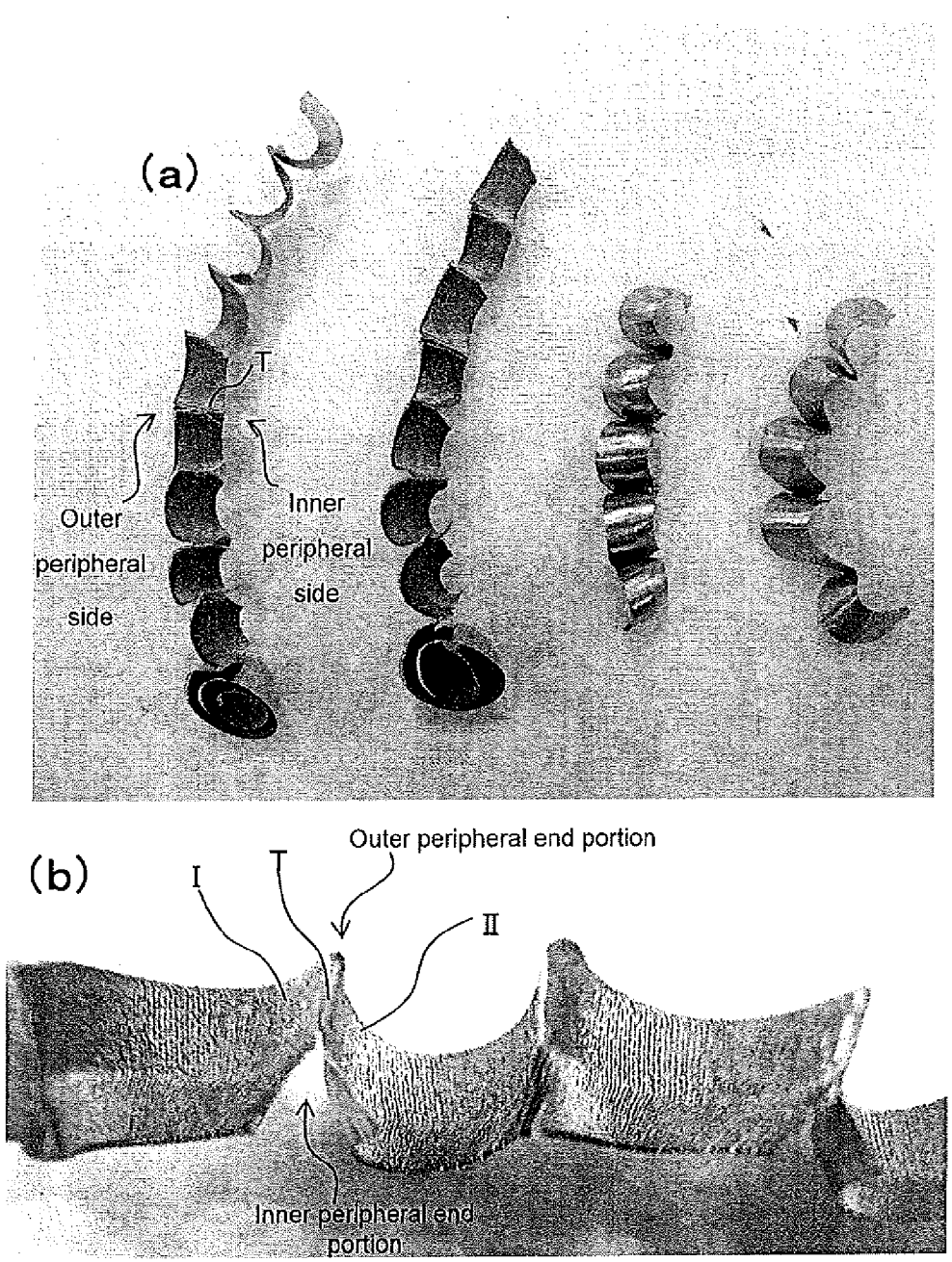
FIG. 7 is a photograph substituted for drawing showing the shapes of chips generated by a second cutting edge 52 of the insert 1.

The upper face 2 further includes a second breaker groove 7 along the second cutting edge 52. The second breaker groove 7 is in a concave shape. The width of the second breaker groove 7 reaches a maximum at a position corresponding to the valley portion 52l of the second cutting edge 52. That is, as shown in FIG. 4(a), a width $W_{52l}$ of the second breaker groove 7 corresponding to the valley portion 52l is the maximum. For example, the width $W_{52l}$ is larger than each of widths $W_{52a}$, and $W_{52c}$ of the second breaker groove 7 which correspond to the outer peripheral end portion 52a and the intersection 52c, respectively. That is, $W_{52l} > W_{52a}$ or $W_{52c}$. As used herein, the width W of the second breaker groove 7 means the width of the groove portion contributing to chip curling action. For example, as shown in FIGS. 5(*a*) to 5(*c*), in the case of having a land, in the cross section of the insert vertical to the second cutting edge 52, the distance from the end portion of the land close to the inner portion of the insert to the upper face (flat face) located closer to the inside than the second breaker groove 7 corresponds to the width of the second breaker groove. Specifically, it is possible to measure as a dimension parallel to the lower face in the above distance. When the second breaker groove 7 is formed continuously with the second cutting edge 52 without having the land, in the cross section of the insert, the distance from the cutting edge to the upper face located closer to the inside than the second breaker groove 7 corresponds to the width of the second breaker groove 7. Also in this case, the width of the second breaker groove 7 can be measured similarly to the above.

By arranging so that the width of the second breaker groove 7 reaches the maximum at the position corresponding to the valley portion 52l of the second cutting edge 52, both end portions in the width direction of the chips can contact the second breaker groove 7 earlier than a substantially middle portion thereof. Thereby, the chips generated by the second cutting edge 52 whose cross-sectional shape is the substantially concave shape can be stably curled while being two-point supported by both end portions of the second breaker groove 7. This reduces a local cutting resistance increase in a substantially middle portion. It is therefore capable of stabilizing the chip discharge direction and also reducing the situation where the substantially middle portions of the chips in the width direction thereof are deposited onto the second breaker groove 7.

The width $W_{52l}$ of the second breaker groove 7 is approximately 1 to 5 mm, preferably 1 to 3.5 mm. The width $W_{52a}$ of the second breaker groove 7 is approximately 0.5 to 2 mm, preferably 0.5 to 1.5 mm. The width $W_{52c}$ of the second breaker groove 7 is approximately 1 to 3 mm, preferably 1 to 2 mm. These $W_{52l}$ and $W_{52a}$ and $W_{52c}$ preferably have the above values and satisfy the above relational expression.

The depth of the second breaker groove 7 reaches a maximum at the position corresponding to the valley portion 52l of the second cutting edge 52. That is, as shown in FIGS. 5(*a*) to 5(*c*), a depth $D_{52l}$ of the second breaker groove 7 corresponding to the valley 52l is larger than the depth of the second breaker groove 7 corresponding to other cutting edge portion. For example, the depth $D_{52l}$ is larger than each of depths $D_{52a}$ and $D_{52c}$ of the second breaker groove 7 which correspond to the outer peripheral end portion 52a and the intersection 52c located on both ends of the second cutting edge 52, respectively. That is, $D_{52l} > D_{52a}$ or $D_{52c}$ is satisfied. Similarly to the above width W, the depth D of the second breaker groove 7 means the depth of the groove portion contributing to the chip curling action. For example, as shown in FIGS. 5(*a*) to 5(*c*), the depth of the second breaker groove 7 can be measured as the depth D of the second breaker groove 7 from the second cutting edge 52 in the direction substantially vertical to the lower face 3. That is, in the cross section vertical to the second cutting edge 52, the distance between the second cutting edge 52 and the lower face of the second breaker groove 7 in the direction vertical to the lower face 3 corresponds to the depth of the second breaker groove 7.

This construction reduces the situation where the substantially middle portions of chips which are generated by the second cutting edge 52l and have the concave-shaped cross section strongly collide with the surface of the second breaker groove 7 and are deposited onto the second breaker groove 7.

The depth $D_{52l}$ of the second breaker groove 7 is approximately 0.2 to 0.5 mm, preferably 0.3 to 0.4 mm. The depth $D_{52a}$ of the second breaker groove 7 is approximately 0.05 to 0.3 mm, preferably 0.1 to 0.2 mm. The depth $D_{52c}$ is approximately 0.05 to 0.3 mm, preferably 0.1 to 0.2 mm. These $D_{52l}$ and $D_{52a}$ and $D_{52c}$ preferably have the above values and satisfy the above relational expression.

In the present embodiment, the second breaker groove 7 satisfies the above relationships in terms of both the width W and the depth. However, the second breaker groove is not limited thereto. Only one of the width W and the depth D of the second breaker groove 7 may satisfy the above relationship.

For example, although in the present embodiment the valley portion 52l of the second cutting edge 52 is a certain point of a curved line portion of the second cutting edge 52 when viewed from side, the valley portion of the second cutting edge is not limited thereto. The valley portion of the second cutting edge may be a region having a certain width. That is, the valley portion of the second cutting edge may be located at a portion of the second cutting edge which is linear and substantially parallel to the lower face 3.

In such an embodiment, the portion of the second breaker groove having the largest width and depth may correspond to at least a part of the valley portion of the second cutting edge having the certain width. It is unnecessary to form so that the width or depth of the groove reaches a maximum in all areas along the entire length of the valley portion of the second cutting edge.

When the valley portion 52l is the linear portion having the certain width, δ52 can be further decreased. That is, when the rake angle of the second cutting edge 52 is kept constant, there is no need to greatly dig down the upper face of the insert 1. Therefore, the excellent chip discharge performance can be exhibited under condition that the width of the second breaker groove 7 is further narrowed than when the valley portion 52l is not linear portion.

On the other hand, when the valley portion 52l is a certain point of a curved line portion, the cross section of the chips in the concave shape becomes closer to a U-shape. Therefore, the chips can be more stably discharged along the second breaker groove 7. When the valley portion 52l is the curved line portion, the valley portion 52l is preferably in the shape of a circular arc having a radius of curvature greater than each of R1 and R2.

In the present embodiment, the upper face 2 includes a convex part 14 at an inner portion of the second breaker groove 7. The convex part 14 is located at a higher position than the second cutting edge 52. That is, as shown in FIG. 5(*b*), it satisfies $H_{14} > Ha$ where $H_{14}$ is a length from the lower face 3 of the convex part 14 to a top portion of the convex part 14 in a direction substantially vertical to the lower face 3. This construction enables the chips to be stably curled.

The top portion of the convex part 14 corresponds to the highest point or face of the convex part 14 in the direction substantially vertical to the lower face 3.

The convex part 14 is located at a higher position than the upper face 2 connected to the first cutting edge 51. That is, the convex part 14 is formed to project upward with respect to a portion of the upper face 2 corresponding to the first cutting edge 51.

In the present embodiment, as shown in FIG. 5(d), the portion of the upper face 2 corresponding to the first cutting edge 51 has a slope 15 located at a lower position as it goes inward along the first cutting edge 51, and a flat face 16 located at an inner portion of the slope 15. The flat face 16 is adjacent to the second breaker groove 7 corresponding to the second cutting edge 52, and to the convex part 14. The convex part 14 is located at a higher position than the flat face 16 adjacent thereto.

In the present embodiment, as shown in FIGS. 6(a) to 6(d), a reinforcing portion 17 located at a higher position than other regions is formed in a region of the upper face connected to the first cutting edge 51 which is adjacent to the top portion 52h of the second cutting edge 52. The reinforcing portion 17 is located close to the central axis of rotation L of the drill holder 11 when the insert 1 is attached to the holder 11 as the inner edge insert 1A. That is, the reinforcing portion 17 is located close to the central axis of rotation L of the inner edge. The portion of the inner edge close to the central axis of rotation L is subjected to a cutting speed of almost zero and is the portion pressed against the workpiece in terms of machining form of the drill. Hence, the portion of the inner edge close to the central axis of rotation L is the portion susceptible to fracture due to an extremely large load during cutting process. While the portion of the inner edge toward the central axis of rotation L is an important portion for prescribing a core height of the inner edge that significantly affects machining accuracy.

In the present embodiment, the fracture of the portion of the inner edge close to the central axis of rotation L can be reduced by the reinforcing portion 17, thus achieving high machining accuracy.

<Cutting Method>

A chip discharge mechanism when cutting process is carried out using the insert 1 of the present embodiment is described below in detail.

Firstly, the cutting process is started with the second cutting edge 52 contacted with the surface of a workpiece. Chips whose cross-sectional shape is the substantially concave shape are generated by the second cutting edge 52. These chips graze the upper face (rake face) placed continuously to the second cutting edge 52. These chips are curled upon contact with the rake face. In the present embodiment, these chips are stably and easily curled by the second breaker groove 7 formed along the second cutting edge 52.

Next, each chip curled along the second breaker groove 7 moves forward in its curled state in the discharge direction. The chip is reversed when it reaches a certain length, and the cross-sectional shape becomes a substantially convex shape when the rake face is viewed from front. The reversed chip is then bent upon contact with the machined wall surface of the workpiece located ahead in the advance direction. Hereat, the portion of the chip which firstly contacts the machined wall surface of the workpiece is the outer peripheral portion of the chip which is subjected to a high rotating speed and is located closest to the machined wall surface of the workpiece in terms of the machining form of the drill. Therefore, a starting point of bending of the chip corresponds to an outer peripheral portion of the chip, and the bending occurs from the outer peripheral portion. Unlike the case where the chip having a linear cross-sectional shape is bent, a larger tensile stress occurs at the bent portion of the chip as it goes away from the starting point, and the larger tensile stress is exerted on an inner peripheral portion of the chip. As a result, the inner peripheral end portion of the chip is liable to stretch. Depending on the case, the inner peripheral end portion in the bent portion T of the chip is slitted and then ripped.

Then, as shown in FIG. 7(b), in the bent chip portion I, a chip portion I located ahead in the discharge direction with the chip bent portion T as a boundary, and a chip portion II located behind the discharge direction contact each other back to back. That is, these chip portions I and II whose cross-sectional shape is the substantially concave shape contact each other with their respective recessed surfaces facing opposite directions. On this occasion, because both of these chip portions I and II have curved line portions in the present embodiment, there is a high probability that these chip portions I and II contact each other, thus leading to stable contact between these chip portions I and II. Then, the outer peripheral portion of a newly generated chip also firstly contacts the machined wall surface of the workpiece as described above. Therefore, force is exerted in a direction in which the outer peripheral portions of these chip portions I and II approach each other as the cutting process proceeds. Thereby, a tensile stress is further generated at the inner peripheral end portion of the bent portion T of the chip. That is, the further tensile stress is generated at the inner peripheral end portion of the chip by jostling of these chip portions I and II. As a result, the inner peripheral end portion of the chip is more liable to stretch and a slit is liable to occur, or it is liable to be ripped.

Thereafter, the bending of the chip is repeated as the cutting process is continued. That is, the step (1) in which the chip is curled until it reaches a certain length, and the curled chip is bent upon contact with the machined wall surface of the workpiece, and the step (2) in which the bent chip is further stretched by the additional tensile stress generated by the jostling of the chip portions I and II located ahead and behind the bent portion T are repeated in this order. The chip obtained in these steps is bent at substantially equal intervals in the length direction of the chip, as shown in FIG. 7(b). Specifically, the micro-shape of the chip is a bellows shape.

In the present embodiment, as shown in FIG. 7(a), the inner peripheral end portion of the bent portion T is slitted and then ripped. Therefore, the micro-shape of the chip corresponds to a shape extended substantially straight.

The chip whose micro-shape is the shape extended substantially straight can stabilize the chip discharge direction and smoothly pass through the flutes placed in communication with the insert pockets. That is, the chip can smoothly move along the twist-shaped flutes as in the present embodiment. This reduces the chips clinging to the drill holder 11. Additionally, the chips having the micro-shape extended substantially straight are susceptible to division in the length direction of the chips by taking advantages of the contact with the inner wall surfaces of the twist-shaped flutes, and the centrifugal force exerted when they depart from the surface of the workpiece, and the like. As a result, the chip discharge performance is further improved. The improved chip discharge performance is suitably obtained in the cutting process of workpieces particularly having excellent ductility, such as stainless steels.

Depending on the kind of workpiece, larger tensile stress is generated as it goes from the starting point to the inner periphery, and the inner peripheral end portion at the bent portion T is not only strechedly bent but also ripped. The chip whose inner peripheral end portion is ripped is easily shaped along the flutes. Hence, the resistance between the chip and the inner wall surfaces of the flutes is further decreased, thereby further enhancing the chip discharge performance. Hereat, the inner peripheral end portion of the chip correspond to the end portion located close to the central axis of rotation L of the drill holder 11 when the chip is generated.

The chip whose inner peripheral end portion is ripped is easily divided in the length direction thereof by the contact with the inner wall surfaces of the flutes or the centrifugal force when it is released outside of the drill 1, or the like. Hence, the chips clogged within the flutes, and the chips clinging to the drill holder 11 can be reduced, thus further enhancing the chip discharge performance.

(Second Embodiment)

Figure 8:
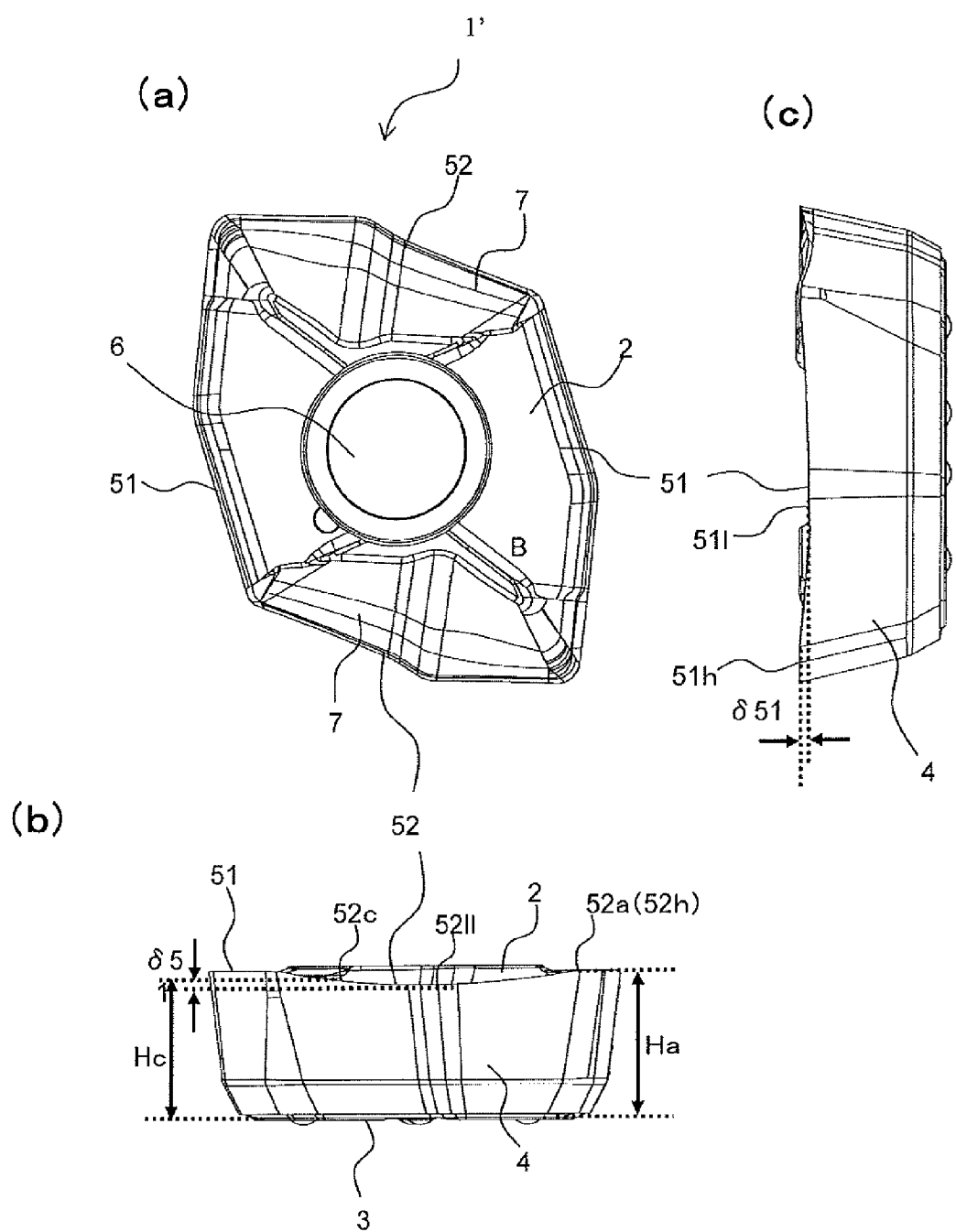
FIG. 8(a) is a top view of a cutting insert 1' according to a second embodiment of the present invention.
FIG. 8(b) is one side view thereof (a side view taken from a short side)
FIG. 8(c) is the other side view thereof (a side view taken from a long side)

An insert 1' of a second embodiment according to the present invention is described below in detail with reference to FIGS. 8(*a*) to 8(*c*). Similar reference numerals are used to denote the constructions similar to those of the insert 1 of the first embodiment, and the descriptions thereof are omitted.

Similarly to the insert 1, the insert 1' of the present embodiment has both of a first cutting edge 51 serving as an inner edge, and a second cutting edge 52 serving as an outer edge so as to be usable as both of a first insert and a second insert.

The first cutting edge 51 of the present embodiment is formed in a concave shape when viewed from side, and is formed so that at least a part thereof is in the shape of a curved line. With this construction, it is possible to decrease the diameter of chips generated by the first cutting edge 51 whose cross-sectional shape is the concave shape. That is, unlike the second cutting edge 52 functioning as the outer edge, the first cutting edge 51 functions as the inner edge for cutting a lower face of a hole while being pressed thereagainst during cutting process. Hence, unlike bellows-shaped chips generated by the second cutting edge 52, the chips generated by the first cutting edge 51 have a helical shape. Even the chips of the characteristic shape are smoothly curled, and the chip discharge direction is stabilized. As a result, the chip discharge performance is further improved, and finished surface accuracy and machined surface accuracy are enhanced.

Similarly to the second cutting edge 52, the first cutting edge 51 has a valley portion 51*l* having the lowest height with respect to a lower face 3, and a top portion 51*h* having the highest height with respect to the lower face 3. As used herein, the valley portion 51*l* and the top portion 51*h* can be prescribed similarly to the valley portion 52*l* and the top portion 52*h* of the second cutting edge 52.

In the present embodiment, a difference δ52 in the thickness direction between the valley portion 51*l* and the top portion 51*h* of the first cutting edge 51 is smaller than a difference δ52 in the thickness direction between the valley portion 52*l* and the top portion 52*h* of the second cutting edge 52.

Owing to this construction, the chips generated by the first cutting edge 51 and the second cutting edge 52 can be stably curled and bent. Therefore, the chip generated by the first cutting edge 51 stably has a helical shape, and the chip generated by the second cutting edge 52 stable has a bellows shape. That is, the first cutting edge 51 and the second cutting edge 52 are in a shape suitable for the inner edge and the outer edge having different chip generating processes, thereby exhibiting excellent chip discharge performance.

Thus, the insert 1' in which both of the first cutting edge 51 and the second cutting edge 52 are formed in the concave shape when viewed from side, and are formed so that at least a part thereof is in the shape of the curved line, can exhibit excellent chip discharge performance in the cutting process of workpieces having excellent ductility.

Although in the present embodiment both of the first cutting edge 51 and the second cutting edge 52 have the curved line portions as described above, without being limited thereto, only the first cutting edge 51 may have the curved line portion when viewed from side.

Although the foregoing first and second embodiments illustrate the cases where both of the first cutting edge 51 and the second cutting edge 52 are constructed from only the curved line portions, these cutting edges are not limited thereto. Each cutting edge may have a linear portion at a middle portion thereof. Alternatively, each cutting edge may have a linear portion in at least one of both ends thereof. That is, in the embodiments of the insert according to the present invention, the first cutting edge may have a substantially concave shape and have the curved line portion in at least a part thereof so that the cross-sectional shape of the generated chip is substantially in the concave shape.

(Third Embodiment)

An insert 1" of a third embodiment according to the present invention is described below in detail with reference to FIGS. 9(*a*) to 11(*d*). Similar reference numerals are used to denote the constructions similar to those of the insert 1 of the first embodiment, and the descriptions thereof are omitted.

Similarly to the insert 1, the insert 1" of the present embodiment has both of a first cutting edge 51 serving as an inner edge, and a second cutting edge 52 serving as an outer edge.

Figure 10:
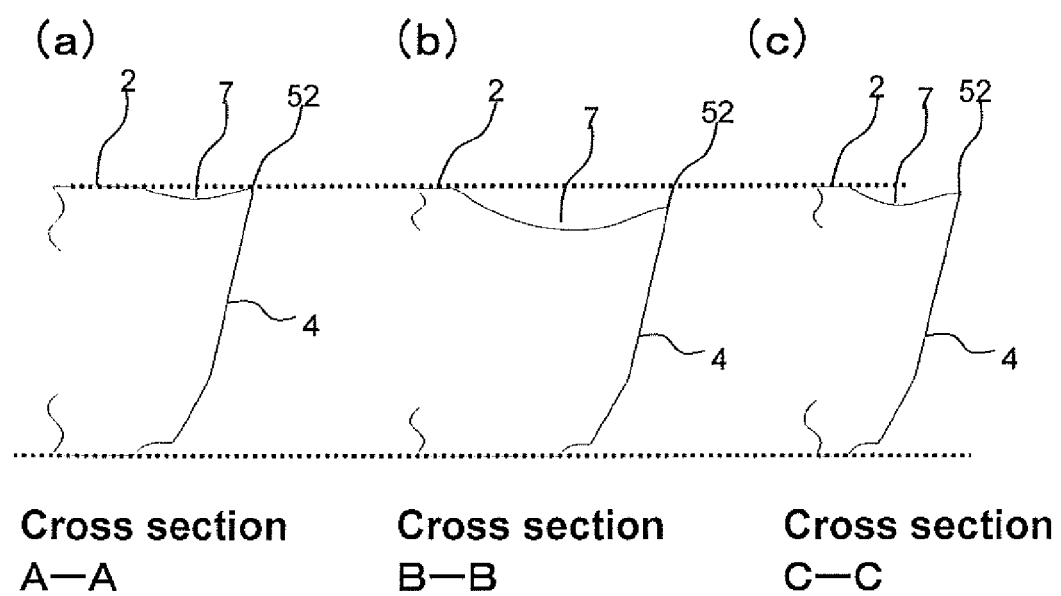
FIG. 10(a) is a sectional view taken along the line A-A in FIG. 9(a)
FIG. 10(b) is a sectional view taken along the line B-B in FIG. 9(a)
FIG. 10(c) is a sectional view taken along the line C-C in FIG. 9(a)

In the insert 1" of the present embodiment, unlike the insert 1 of the first or second embodiment, an upper face 2 does not comprise the convex part 14. That is, as shown in FIGS. 10(*a*) to 10(*c*), and FIG. 11(*b*), a portion of the upper face 2 located at an inner portion of a second breaker groove 7 is connected without level difference from a portion of the upper face 2 connected to the first cutting edge 51. That is, there is no boundary between the portion of the upper face 2 corresponding to the second cutting edge 52 and the portion of the upper face 2 corresponding to the first cutting edge 51, and the inner portion of the upper face 2 is constructed from a surface. In the present embodiment, when the insert 1" is used as an inner edge insert, the chips generated by the first cutting edge 51 can smoothly flow along the portions of the upper face 2 constructed from the identical surface. Consequently, the chip discharge performance is improved.

Even the insert of small size sharing the identical surface can ensure a wide width of the second breaker groove 7 while ensuring the upper face portion at the inner portion of the second breaker groove 7. Therefore, the chip generated by the second cutting edge 52 can contact in the length direction thereof with the second breaker groove 7 over a long distance, thereby further improving the chip discharge performance.

The strength in the vicinity of a circumferential edge of an opening of a through hole 6 can be increased by placing the upper face portion at the inner portion of the second breaker groove 7. That is, by allowing an upward slope of the second breaker groove 7 to be connected to the outer peripheral edge of the through hole 6, the cross section of an intersection of the circumferential edge of the opening of the through hole 6 and the second breaker groove 7 has an acute angle, thus reducing deterioration of the strength of the circumferential edge of the opening of the through hole 6. This reduces fracture of the circumferential edge of the opening of the through hole 6.

In the present embodiment, the identical surface described above is substantially parallel to the lower face 3, as shown in FIGS. 10(*a*) to 10(*c*).

Figure 9:
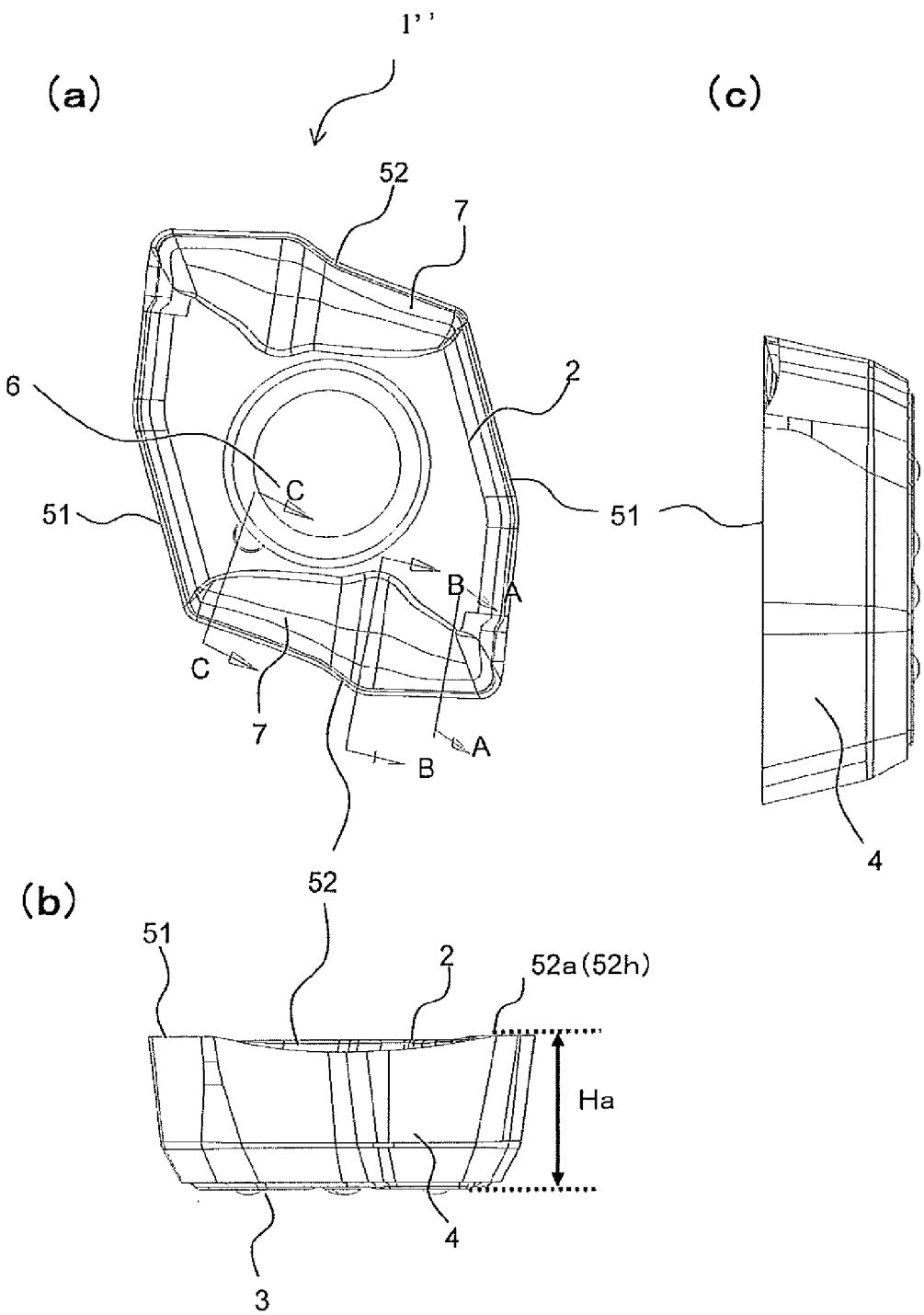
FIG. 9(a) is a top view of a cutting insert 1" according to a third embodiment of the present invention.
FIG. 9(b) is one side view thereof (a side view taken from a short side)
FIG. 9(c) is the other side view thereof (a side view taken from a long side)

Additionally, in the present embodiment, as shown in FIG. 9(*b*), a top portion 52*h* of the second cutting edge 52 is located at a higher position than the portion of the upper face 2 located at the inner portion of the second breaker groove 7.

Figure 11:
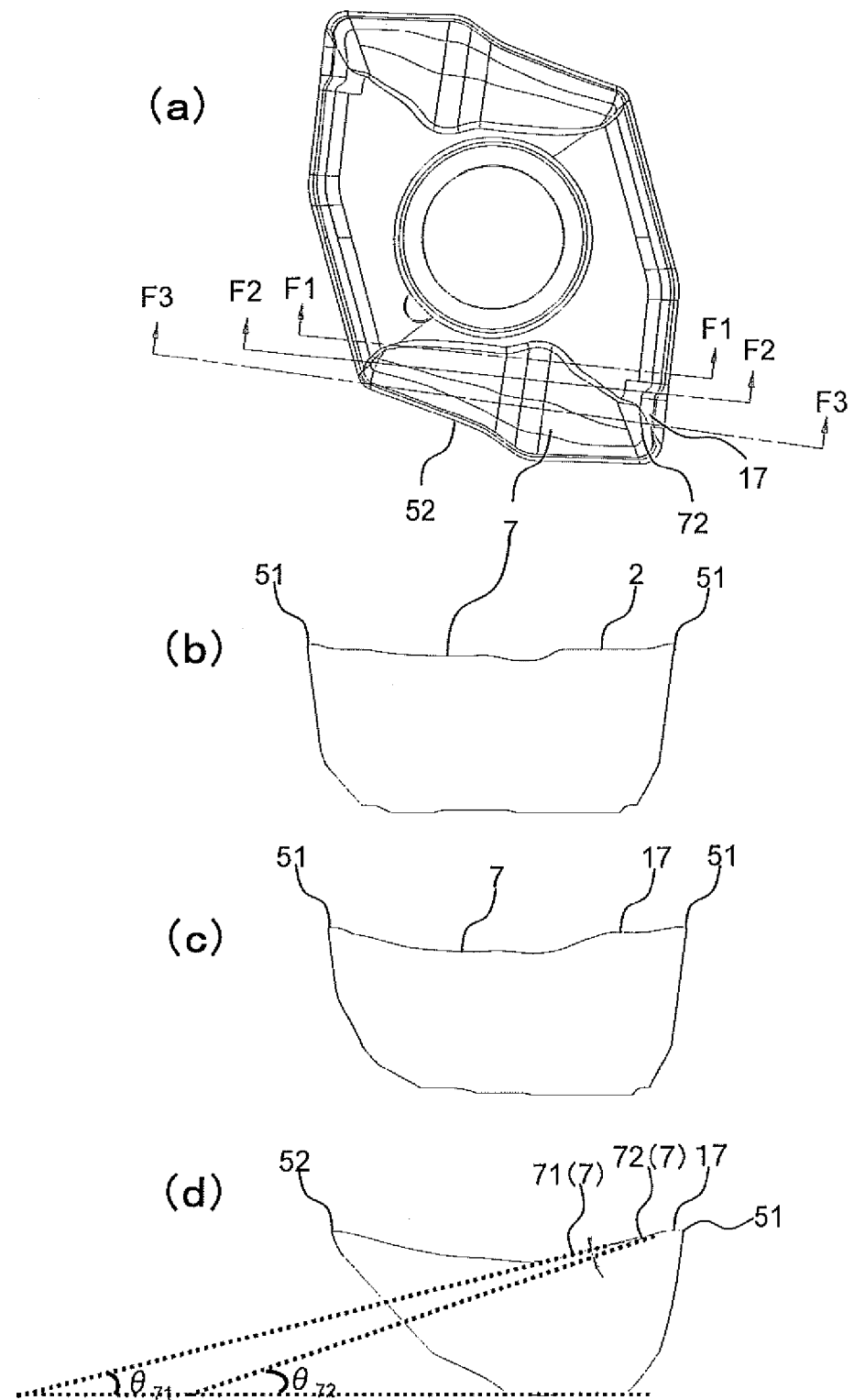
FIG. 11(a) is a top view of the insert 1"
FIG. 11(b) is a sectional view taken along the line F1-F1 in FIG. 11(a)
FIG. 11(c) is a sectional view taken along the line F2-F2 in FIG. 11(a)
FIG. 11(d) is a sectional view taken along the line F3-F3 in FIG. 11(a).

As shown in FIG. 11(*d*), the second breaker groove 7 is in a concave shape in a cross section substantially vertical to a central axis of rotation L of a holder 11. In the sectional view shown in FIG. 11(*d*), a region located close to the top portion 52*h* of the second breaker groove 7 includes a middle portion 71, and an end portion 72 located close to a top portion 51*h* with respect to the middle portion 71. An inclination angle $\theta_{72}$ of the end portion 72 is greater than an inclination angle $\theta_{71}$ of the middle portion 71 ($\theta_{72} > \theta_{71}$).

Hereat, the inclination angle of the middle portion 71 and the inclination angle of the end portion 72 are their respective inclination angles $\theta_{71}$ and $\theta_{72}$ in the sectional view with respective to the lower face 3. When these portions are constructed from a curved surface, their respective inclination angles are taken as inclination angles of a tangent line at the end portion close of the top portion 52h.

As used herein, the sectional view is a sectional view passing through the second breaker groove 7 and being vertical to the lower face 3 when the insert 1 is attached to the holder 11. In the present embodiment, it corresponds to the sectional view taken along the line F3-F3 of FIG. 11(a).

In the present embodiment, the second breaker groove 7 has the end portion 72 described above, so that the outer peripheral portion of the chip generated by the second cutting edge 52 is subjected to curling action by the end portion 72. Consequently, the cross-sectional shape of the chip generated by the second cutting edge 52 can be further stably formed in a concave shape.

The end portion 72 having a greater inclination angle is located on the outer peripheral side of the holder 11 when the insert 1 is attached to the holder 11 as an outer edge insert 1B. Therefore, the chip generated by the second cutting edge 52 is easily formed in a helical shape with the inner peripheral side of the chip as an axis. That is, the chip is discharged with the outer peripheral side thereof facing a further inner peripheral side, so that the chip has a stable helical shape. This enhances the effect of reducing the situation where the chips generated by the second cutting edge 52 are clogged in the twist-shaped flutes.

In the present embodiment, the width of the end portion 72 is substantially constant when viewed from above. This construction reduces the situation where the inclination angle between the reinforcing portion 17 located at a high position and the end portion 72 adjacent thereto varies greatly as it goes inward from the second cutting edge 52. This reduces a local large load exerted on the end portion 72, and therefore the chip clogging is reduced, and the chip discharge performance is further enhanced.

<Method of Manufacturing Cut Product>

Finally, an embodiment of a method of manufacturing a cut product according to the present invention is described.

The method of manufacturing the cut product according to the present embodiment includes the following steps (i) to (iii).

(i) the step of bringing each of the cutting edges of the inner edge insert 1A and the outer edge insert 1B closer to a workpiece by rotating at least one of the workpiece and the drill 1 of the foregoing embodiment;

(ii) the step of cutting the workpiece by bringing the cutting edges 5 into contact with the surface of the workpiece; and (iii) the step of separating the cutting edges from the workpiece.

In the step (i) of the present embodiment, the cutting edges 5 of the inner edge insert 1 and the outer edge insert 1B are brought closer to the workpiece by rotating the drill 1 with the workpiece left to stand. Specifically, the first cutting edge 51 is brought closer to the workpiece in the inner edge insert 1A. The second cutting edge 52 is brought closer to workpiece in the outer edge insert 1B.

In the cutting method of the present embodiment, the cutting process is carried out using the drill 10 having excellent chip discharge performance, thereby reducing the chips clinging to the drill holder 11 during the cutting process. It is therefore capable of reducing the situation where the clinging chips clog the flutes serving as the chip discharge passage, and block the chip discharge. This reduces damage to the machined wall surface of the workpiece due to the clogged chips, thereby achieving the cutting process having high finished surface accuracy.

Although the several embodiments according to the present invention have been described and illustrated above, it is to be understood that the present invention is not limited to the foregoing embodiments and is applicable to those in which improvements and changes are made within the gist of the present invention.

The invention claimed is:

1. A drill, comprising:
   a substantially columnar drill holder comprising, at a front end portion thereof, a first insert pocket and a second insert pocket formed closer to the outer periphery of the drill holder than the first insert pocket;
   a first insert which is attached to the first insert pocket and comprises a first cutting edge at an intersection of an upper face and a side face thereof; and
   a second insert which is attached to the second insert pocket and comprises a second cutting edge at an intersection of an upper face and a side face thereof, wherein
   the first insert pocket is located passing through a central axis of rotation of the drill holder, and
   the second cutting edge has a concave shape when viewed from the front end side of the drill holder, and has a curved line at least a part thereof,
   the second cutting edge further comprises at least two circular arc portions when viewed from the front end side of the drill holder, and
   a radius of curvature R1 of the circular arc portion located closer to the central axis of rotation of the drill holder is smaller than a radius of curvature R2 of the circular arc portion located closer to the outer periphery of the drill holder.

2. The drill according to claim 1, wherein
   the second cutting edge comprises an intersection intersecting with a rotation locus of the first cutting edge, and
   the intersection is located closer to a lower face than an outer peripheral end portion of the second cutting edge.

3. The drill according to claim 1, wherein the second cutting edge further comprises a linear portion between the two circular arc portions.

4. The drill according to claim 1, wherein a valley portion located closest to the lower face of the second cutting edge is located closer to the central axis of rotation of the drill holder than a middle portion of the second cutting edge.

5. The drill according to claim 4, wherein
   the upper face of the second insert comprises a first breaker groove formed along the second cutting edge, and
   the width of the first breaker groove is a maximum at a position corresponding to the valley portion of the second cutting edge.

6. The drill according to claim 4, wherein
   the upper face of the second insert comprises a first breaker groove formed along the second cutting edge, and
   the depth of the first breaker groove is a maximum at a position corresponding to the valley portion of the second cutting edge.

7. The drill according to claim 1, wherein the first cutting edge has a concave shape when viewed from the front end side of the drill holder, and has a curved line at least a part of the first cutting edge.

8. The drill according to claim 7, wherein
each of the first cutting edge and the second cutting edge comprises a top portion farthest away from the lower face and a valley portion located closest to the lower face, and
a difference in a thickness direction between the top portion and the valley portion of the first cutting edge is smaller than a difference in a thickness direction between the top portion and the valley portion of the second cutting edge.

9. A cutting insert configured to be used with attached to a drill holder, comprising:
a cutting edge at an intersection of an upper face and a side face, wherein
the cutting edge
is located closer to the outer periphery of the drill holder during attachment to the drill holder, has a concave shape when viewed from side, and has a curved line at least a part of the cutting edge,
the cutting edge comprises at least two circular arc portions when viewed from side, and
a radius of curvature R1 of the circular arc portion located closer to the central axis of rotation of the drill holder is smaller than a radius of curvature R2 of the circular arc portion located closer to the outer periphery of the drill holder.

10. The cutting insert according to claim 9, wherein
the upper face comprises a first breaker groove formed along the cutting edge, and
the width of the first breaker groove is a maximum at a position corresponding to the valley portion of the cutting edge.

11. The cutting insert according to claim 9, wherein
the upper face comprises a first breaker groove formed along the second cutting edge, and
the depth of the first breaker groove is a maximum at a position corresponding to the valley portion of the cutting edge.

12. The cutting insert according to claim 9, wherein the upper face comprises a convex part which is located at an inner portion of the first breaker groove and is at a higher position than the cutting edge.

13. A method of manufacturing a cut product, comprising:
bringing each of the cutting edges of the inserts closer to a workpiece and rotating at least one of the workpiece and the drill according to claim 1;
cutting the workpiece by bringing the cutting edges into contact with the surface of the workpiece; and
separating the cutting edges relatively from the workpiece.

* * * * *